United States Patent [19]
Garford

[11] 4,149,468
[45] Apr. 17, 1979

[54] BOGIE POSITIONING DEVICE FOR TRACTOR-TRAILER UNITS

[76] Inventor: Andrew Garford, 10755 - 164 St., Edmonton, Alberta, Canada

[21] Appl. No.: 803,468

[22] Filed: Jun. 6, 1977

[51] Int. Cl.² .............................................. B62D 63/08
[52] U.S. Cl. .................... 104/32 R; 280/80 B
[58] Field of Search .................... 280/80 A, 80 B; 104/32 R, 32 A, 33, 48

[56] References Cited
U.S. PATENT DOCUMENTS

| | | | |
|---|---|---|---|
| 2,903,978 | 9/1959 | Gayner | 104/32 R |
| 2,962,295 | 11/1960 | Tenenbaum | 280/80 B |
| 2,965,046 | 12/1960 | Chambers | 104/32 R |
| 4,057,018 | 11/1977 | Laurent | 104/48 |

FOREIGN PATENT DOCUMENTS 949444 8/1949 France ........................................ 104/48

Primary Examiner—Francis S. Husar
Assistant Examiner—Ross Weaver
Attorney, Agent, or Firm—Shlesinger, Arkwright, Garvey & Dinsmore

[57] ABSTRACT

A bogie slide for re-positioning the rear wheels of a tractor trailer unit includes a carriage movably mounted on tracks for movement between stops. The trailer is backed onto the carriage, i.e. the rear wheels of the trailer are positioned on the carriage against a pair of wheel chocks, the pins holding the rear wheel bogies of the trailer are removed, and the trailer is moved with the carriage against one of the stops. As the trailer continues to move rearwardly, the wheels, bogies and carriage remain stationary, so that the wheels and bogie are moved forwardly along the base of the trailer.

3 Claims, 6 Drawing Figures

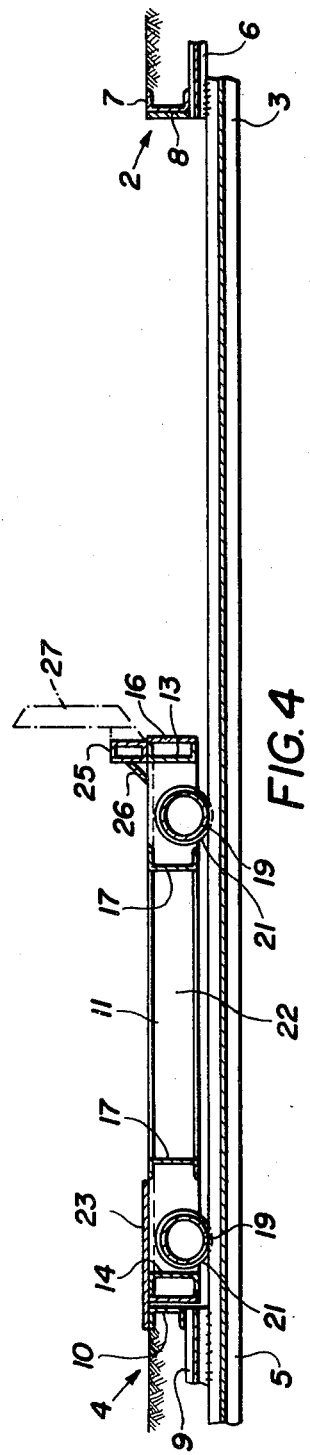
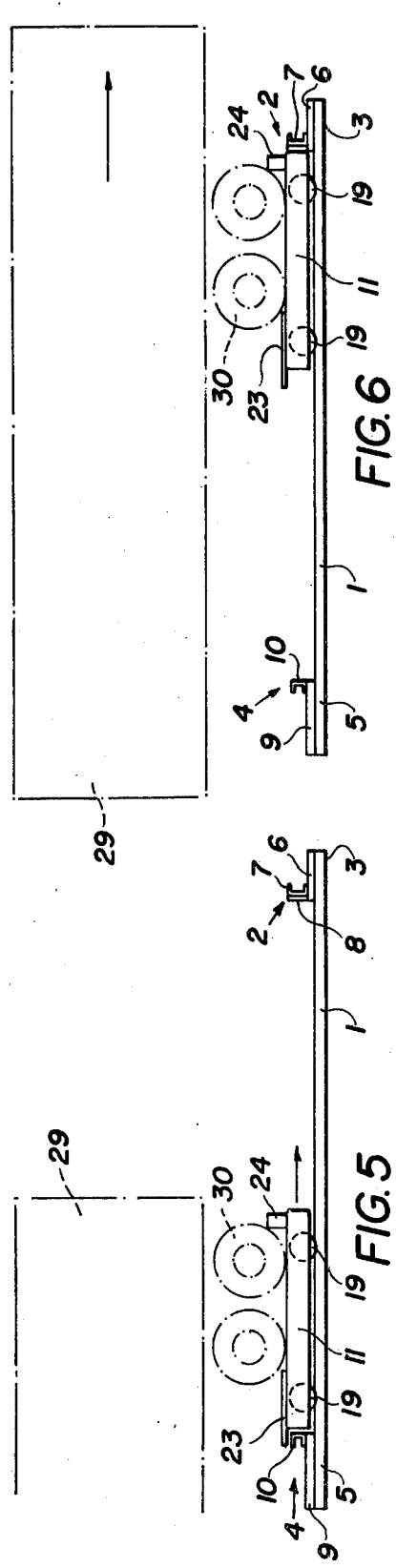

BOGIE POSITIONING DEVICE FOR TRACTOR-TRAILER UNITS

FIELD OF THE INVENTION

This invention relates to a bogie slide, and in particular to a bogie slide for use in the longitudinal adjustment of the position of the rear wheels of tractor trailers.

BACKGROUND OF THE INVENTION

It is common practice to change the position of the rear wheels on the trailer of a tractor trailer, so that the front and rear trailer wheels are spaced equidistant from the centre of gravity of the load and trailer, or for facilitating unloading of the trailer by tilting its rear end downwardly. For such purpose, the rear wheels are mounted on a bogie which is slidably mounted on rails connected to the base of the trailer. The bogie is maintained in position by pins extending transversely from the bogie into holes in the rails. In order to re-position the rear trailer wheels, the usual practice is to remove the pins from the holes and then back the trailer into a solid object which is below the level of the base of the trailer. As a result, the wheels are pushed forward, and, when they reach the desired position, the wheel bogies are re-pinned to lock them in such position. Unfortunately, such usual method of re-positioning the wheels leaves a lot to be desired. The repeated bumping and banging of the trailer may lead to damage to the trailer and its contents.

An alternative manner of re-positioning the trailer wheels is disclosed by U.S. Pat. No. 3,303,950 which issued to Ronald K. Jones on Feb. 14, 1967. The Jones patent discloses an apparatus including a jack on each side of the rear end of the trailer, and a sprocket/chain drive connected to the rear wheel bogie for moving the bogie and rear wheels longitudinally of the trailer once the rear end of the trailer has been raised by means of the jacks. The Jones' apparatus is somewhat complicated, relying on a pair of jacks which occupy space in the rear of the trailer, and motor and pump units for driving the jacks and sprocket/chain drive. Moreover, use of the Jones' apparatus is time consuming, because it is necessary to raise the rear end of the trailer before the rear wheels can be moved.

Thus, it is readily apparent that there is a need for an apparatus or device for facilitating re-positioning of the rear wheels of the trailer of a tractor trailer unit. The object of the present invention is to provide a relatively simple bogie slide device which meets such need.

SUMMARY OF THE INVENTION

Accordingly, the present invention relates to a bogie slide device for re-positioning the rear wheels of a tractor trailer unit comprising a frame, said frame including a pair of parallel rails defining the sides of the frame, first stop means interconnecting said rails at one end thereof; second stop means interconnecting the other end of said rails; a carriage movably mounted on said rails for movement between said first and second stop means; a pair of wheel chocks on one end of said carriage for arresting movement of the rear wheels of a tractor trailer, whereby, when a trailer is backed into position with the rear wheels on the carriage and the bogie supporting said rear wheels is released from the base of the trailer, continued rearward movement of the trailer causes the carriage to move against said second stop means to stop the wheel bogie and wheels while the trailer continues rearward movement to re-position the rear wheels forwardly on the trailer.

BRIEF DESCRIPTION OF THE DRAWINGS

The invention will now be described in greater detail with reference to the accompanying drawings, which illustrate a preferred embodiment of the invention and wherein:

FIG. 4 is a longitudinal sectional view taken generally along line IV—IV of FIG. 2; and FIGS. 5 and 6 are schematic elevation views of the device of FIGS. 1 to 4 in use.

DESCRIPTION OF THE PREFERRED EMBODIMENT(S)

Figure 1:
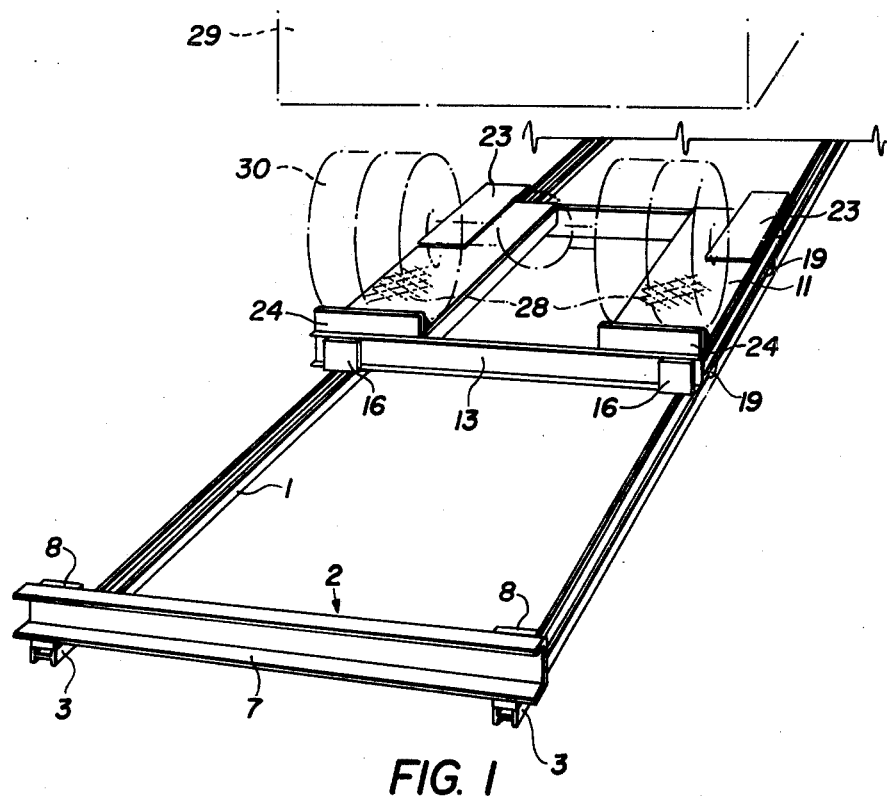
FIG. 1 is a perspective view of a bogie slide device in accordance with the present invention in use, the rear end of a trailer being illustrated in phantom outline.
Figure 3:
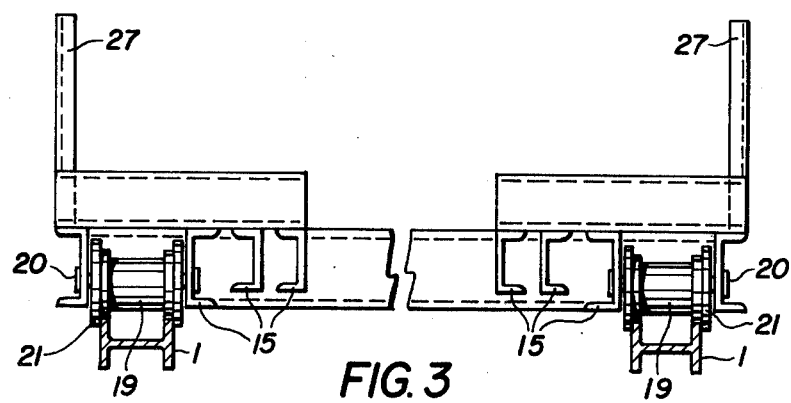
FIG. 3 is a cross-sectional view taken generally along line III—III of FIG. 2.

With reference to the drawings, and in particular to FIGS. 1 to 4, the bogie device of the present invention includes a frame defined, in part, by a pair of parallel rails 1 in the form of I-beams. A first stop, generally indicated at 2, is provided at leading end 3 of the rails 1, and a second stop, generally indicated at 4, is provided at trailing end 5 of the rails. The stop 2 includes a longitudinally extending beam 6 welded to each rail 1 in the top bight thereof, a C-shaped beam or section of channel iron 7 extending transversely between the beams 6 and welded thereto, and a rectangular plate 8 welded to the outer surface of the beam 7 above each rail 1. The stop 4 includes longitudinally extending beams 9 welded in the top bight of each rail 1 and a C-shaped beam 10 extending transversely between the beams 9 and welded thereto. The rails 1, and stops 2 and 4 are placed in a depression in the ground, so that the top of the stops 2 and 4 are substantially at ground level.

Figure 2:
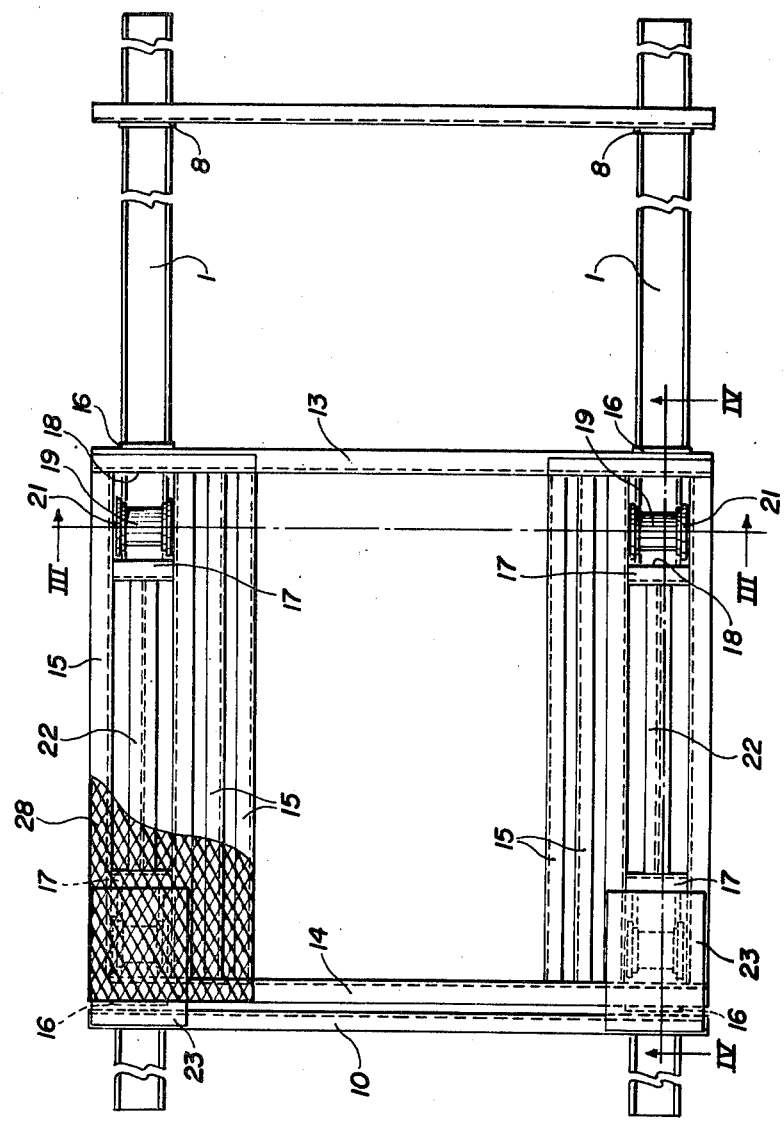
FIG. 2 is a plan view of the bogie slide of FIG. 1 with parts removed.

A carriage 11 is mounted on the rails 1 for movement between the stops 2 and 4. The carriage 11 includes a rectangular frame formed by front and rear ends 13 and 14, respectively with a plurality of longitudinally extending beams 15 extending between the ends at each side thereof. Each end 13 and 14 is formed by a C-shaped beam with rectangular plates 16 fixedly mounted on their outer surfaces near each corner for engaging the stop 2 or 4. As best shown in FIG. 2, because of the load to be carried by the carriage 11, a plurality of beams 15 are required to provide the necessary strength.

Short transverse braces 17 are provided near each corner of the carriage 11 between the outermost and second beams 15 for defining rectangular openings 18 in the carriage for receiving rollers 19. The rollers 19 are rotatably mounted on axles 20 extending between the outermost and second beams 15. Each roller 19 has an annular flange 21 (FIG. 3) at each end thereof for ensuring that the carriage 11 stays on the rails 1. On each side of the carriage 11 a longitudinal reinforcing beam 22 extends between the transverse braces 17. A ramp in the form of a rectangular plate 23 is provided at each corner of the trailing end 14 of the carriage 11 covering the roller opening 18 and extending beyond the rear end of the carriage for overlapping the stop 4 when the carriage is in its rest position (FIGS. 5 and 6). A chock 24 is mounted on each front corner of the carriage 11 for limiting movement of truck wheels on the carriage, as described in greater detail hereinafter. The chock 24 is in the form of a short section of metal tube 25, having a rectangular cross-sectional configuration, and an inclined brace 26. Each leading corner of the carriage 11 is also provided with a vertically extending guide post 27 mounted on the outer end of the chock. This feature of the invention is optional and is omitted from most figures of the drawings.

The entire top surface of each side of the carriage 11, including the plates 23 but excluding the chocks 24, is covered by an expanded metal cover 28 (FIGS. 1 and 2) providing a support for trailer wheels.

Referring to FIGS. 5 and 6, the operation or use of the apparatus will now be described. As mentioned hereinbefore, the apparatus is placed in a depression in the ground so that the stops 2 and 4 are flush with the tops of the ends of the depression. This can be achieved by placing the apparatus on flat ground, and fabricating ramps of earth, concrete or asphalt at the leading and trailing ends thereof. With the apparatus thus positioned, a trailer 29 is backed onto the apparatus, so that the rear wheels 30 are positioned on the carriage in engagement with the chocks 24 (FIG. 5). Using the outer rear view mirrors of the tractor and the guide posts 27, the driver of the tractor trailer unit can ensure that the trailer is moving onto the carriage properly. The pins (not shown) holding the rear wheel bogie (not shown) in position on the base of the trailer 29 are removed, and the trailer is moved slowly in reverse. As the trailer 29 continues to move in reverse, the carriage 11 moves along the rails 1 until the front end plates 16 engage the plates 10 of stop 2 at the leading end 3 (in the direction of travel of the carriage) of the rails 1. Continued movement of the trailer 29 causes the bogie and rear wheels 30 to move forward along the base of the trailer 29. The trailer 29 can be stopped and the bogie repinned at the desired position.

In order to reverse the process, i.e. to move the bogie and rear wheels rearwardly along the base of the trailer, the bogie is unpinned, the rear wheels are braked and the trailer is moved forward (using the tractor of the tractor trailer combination).

Thus, there has been described a relatively simple bogie slide device, which facilitates re-positioning of the rear wheels of a tractor trailer unit without damage to the trailer or its contents.

What is claimed is:

1. An apparatus for re-positioning the slidable rear bogie of a tractor trailer unit along the base of the trailer, said device comprising a frame including a pair of parallel rails defining the sides of the frame, first stop means interconnecting said rails at one end thereof; second stop means interconnecting the other end of said rails; a carriage movably mounted on said rails for movement between said first and second stop means; a pair of wheel chocks one on each end of said carriage for arresting movement of the rear wheels of a tractor trailer, whereby, when a trailer is backed into position with the rear wheels on the carriage and the bogie supporting said rear wheels is released from the trailer, continued rearward movement of the trailer causes the carriage to move against said second stop means to stop the bogie and wheels while the trailer continues rearward movement to re-position the rear wheels forwardly on the trailer.

2. A device according to claim 1, wherein said carriage includes a rectangular frame, rollers rotatably mounted at each corner of said rectangular frame, and ramp means extending outwardly from one end of said rectangular frame for overlapping said first stop means, facilitating passage of rear trailer wheels onto the carriage.

3. A device according to claim 2, wherein said carriage includes guide posts at one end thereof for facilitating proper positioning of said rear trailer wheels on the carriage.

* * * * *